Patented Jan. 19, 1943

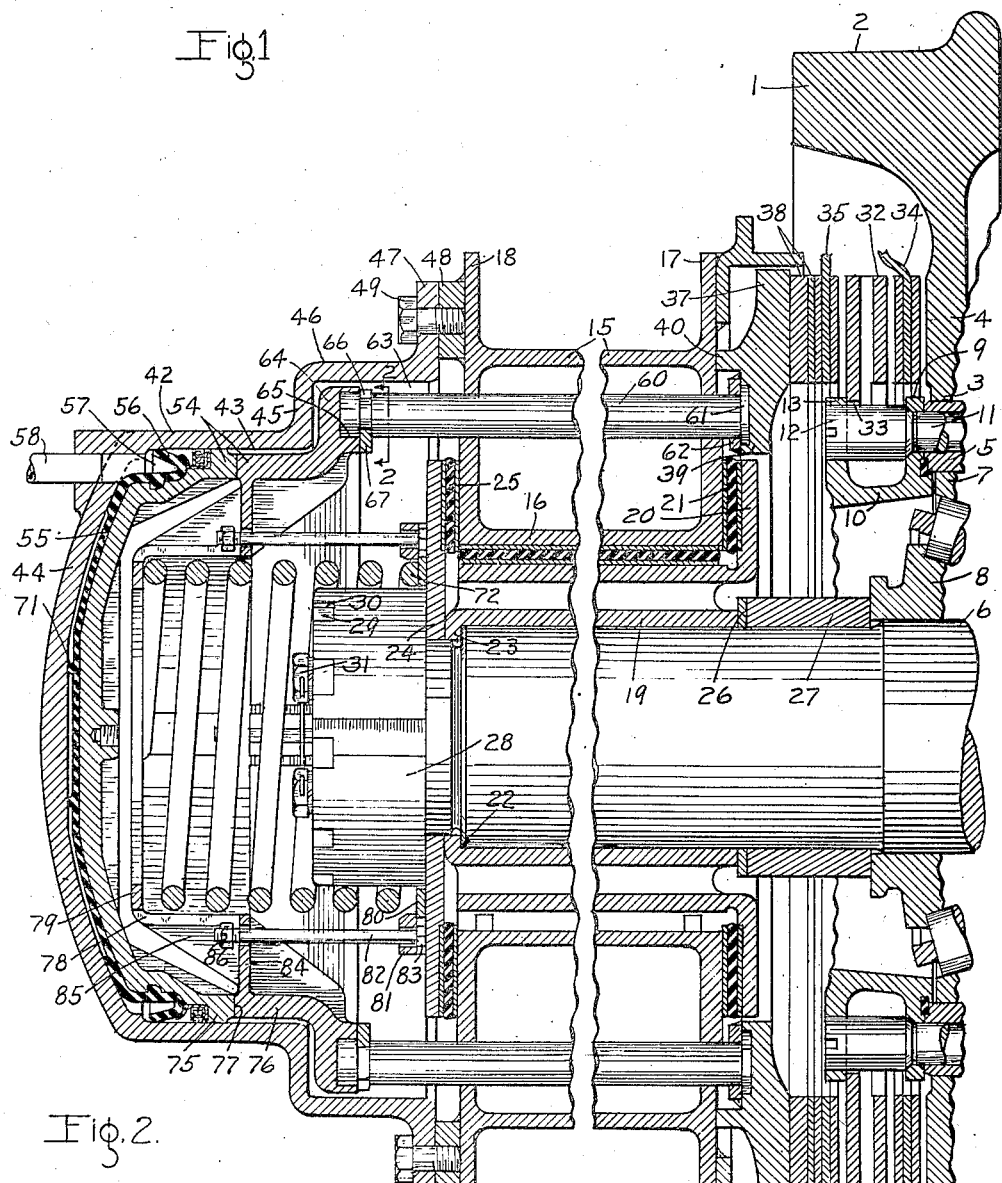

2,308,889

UNITED STATES PATENT OFFICE 2,308,889

BRAKE MECHANISM

Joseph C. McCune, Edgewood, Pa., assignor to The Westinghouse Air Brake Company, Wilmerding, Pa., a corporation of Pennsylvania Application May 1, 1941, Serial No. 391,224

12 Claims. (Cl. 60—62.6)

This invention relates to fluid pressure controlled motor devices and more particularly to the single acting type such as brake cylinder devices employed in fluid pressure brake systems.

In the copending application of Ellis E. Hewitt, Serial No. 253,316, filed January 28, 1939, issued as Patent No. 2,277,106 on March 24, 1942, and assigned to the assignee of this application, there is disclosed a brake cylinder device embodying a casing which is secured to the outboard end of a journal box of the type employed in connection with railway vehicle trucks. This casing contains a brake cylinder piston which is adapted to be moved in the direction of the journal box by fluid under pressure for applying the brakes on the truck. A release spring in the casing acts on the piston for moving same in the opposite direction to a release position for releasing the brakes on the truck when the fluid under pressure is released from the brake cylinder device.

In order to inspect, lubricate, or repair the piston or other internal parts of the brake cylinder device it is necessary to remove the bolts securing the casing to the journal box. When these bolts are removed, the release spring being under compression and acting on the piston will tend to throw the piston and cylinder away from the journal box and thus possibly injure a workman. Furthermore, in order to mount the cylinder and piston on the journal box, it must be forced to its working position against the tension of the release spring and this is not only difficult for a workman to do but it is also dangerous.

The principal object of the invention is therefore the provision of an improved brake cylinder device embodying means for limiting the expansion of the release spring to a degree which will facilitate assembling and disassembling of the brake cylinder device and which will obviate possibility of injury to a workman during such operations.

Other objects and advantages will be apparent from the following more detailed description of the invention.

In the accompanying drawing; Fig. 1 is a sectional view taken through a wheel and journal box transversely of a railway vehicle truck and through a coaxially arranged disk brake mechanism embodying the invention; and Fig. 2 is a sectional view taken on the line 2—2 in Fig. 1.

Description

The portion of vehicle truck and disk brake mechanism shown in the drawing may be substantially like that disclosed in the aforementioned Hewitt application and the following description thereof will therefore be limited to only such details as are deemed necessary to a clear and comprehensive understanding of the invention.

In the drawing, the reference numeral 1 indicates a wheel of a railway vehicle truck having the usual flanged tread portion 2, a central hub portion 3 and an intermediate annular connecting web 4. The hub 3 is rigidly connected to one end of a sleeve 5 which extends across the truck and secures the two wheels of a wheel and axle assembly rigidly in spaced relation. Extending through the sleeve 5 is a normally non-rotating axle 6 which is supported at each of the opposite ends of said sleeve in a roller bearing assembly comprising an outer race 7 disposed in the open end of the tube 5 and an inner race 8 mounted on the axle 6.

Encircling the axle 6 at the outboard face of wheel 1 and bearing against the end of axle tube 5 and the outer bearing race 7 is the flange 9 of a brake ring 10. This flange is rigidly secured in position by a plurality of torque bolts 11 which extend through and are rigidly secured to the end of sleeve 5. Each of the torque bolts 11 is provided with a portion 12 projecting in a direction away from the end of sleeve 5 and disposed in a suitable bore in an outwardly extending part 13 of the brake ring 10.

Disposed outboard of the wheel 1 is a journal box 15 having a central portion 16 and at the inboard and outboard ends thereof flanges 17 and 18 respectively. The central portion 16 has a central opening in which there is disposed a sleeve 19 made of anti-friction material, such as bronze, and bearing on the extended end portion of axle 6. The sleeve 19 has at its inboard end an outwardly extending flange 20 between which and the adjacent face of journal box flange 17 is interposed a pad 21. The outboard end of the sleeve is flanged inwardly over a shoulder 22 provided on axle 6, this flange being indicated by the reference numeral 23. Mounted over the end of the axle 6 and engaging the flange 23 is a backing plate 24. This plate overlaps the outboard flange 18 of the journal box and a pad 25 is interposed therebetween.

The inboard end of sleeve 19 engages one side of a spacer ring 26 the opposite side of which engages one end of a shrink collar 27, said ring and collar being mounted on the axle 6. The opposite end of the shrink collar 27 in turn bears against the inner race 8 of the roller bearing which is disposed between the axle tube 5 and the normally non-rotating axle 6. A nut 28 is mounted on the outer end of axle 6 and has screw-threaded engagement therewith. This nut is screwed up against the backing plate 24 which bears against the outboard end of sleeve 23. By proper adjustment of this nut, therefore, the sleeve 19, spacer ring 26, and shrink collar 27 may be adjusted lengthwise of the axle 6 against the inner bearing race 8 for adjusting the roller bearing between the axle tube 5 and axle 6. The nut 28 is adapted to be held in an adjusted position on axle 6 by a key 29 fitting in suitably aligned slots 30 provided in the outer face of the nut. The key 29 may be secured to the end of the axle 6 by cap screws 31.

A rotatable brake disk or rotor 32 encircles the projecting part 12 of the torque bolts 11 and is provided around its inner peripheral edge with suitable notches 33 in which the projecting portions 11 of said bolts are disposed for supporting said rotor and for turning same with the wheel 1. Both of the opposite radial faces of the rotor 32 constitute friction braking surfaces and the adjacent surface on the wheel web 4 constitutes another friction brake surface.

Interposed between the wheel web 4 and adjacent face of the rotor 32 is an annular non-rotatable braking disk or stator 34, while disposed at the opposite face of rotor 32 is another annular non-rotatable braking disk or stator 35. These two stators and the interposed rotor are adapted to be moved axially in the direction of wheel 1 into frictional interengagement to effect braking of said wheel and are adapted to be moved in the opposite direction out of contact with each other to brake release positions, shown in the drawing, for releasing the brakes on the wheel. The means for holding the two stators against turning when in frictional contact with the rotor 32 and wheel web 4 and the means for moving said stators and the rotor 32 to their release positions shown are, for the sake of simplicity, not shown in the drawing.

For moving the brake elements axially into frictional engagement to brake the wheel 1 a ring 37 is provided. This ring has an outer portion between which and stator 35 is interposed suitable spacers 38. The ring also has an inner portion 39 encircling the flange 20 at the inboard end of sleeve 19 and is provided with suitable stops 40 adapted to engage the inboard flange 17 of the journal box for limiting movement of the brake elements away from each other and for thereby defining their brake release positions.

Disposed beyond the outboard journal box flange 18 is a brake cylinder device arranged in coaxial relation with the normally non-rotatable axle 6. The brake cylinder device comprises a body portion 42 having interiorly a piston bore 43 which at the outboard end of the body portion is closed preferably by an integrally formed pressure head 44. At the inner end of the body portion 42 there is provided an outwardly extending annular web 45 connecting the body portion to a cylindrical portion 46 of greater diameter than said body portion. The portion 46 extends in the direction of the journal box and is provided at its inboard end with an annular outwardly extending flange 47. This flange is mounted against a ring 48 which is secured by welding to the outboard journal box flange 18. The ring 48 is provided with a plurality of screw threaded bores aligned with suitable smooth walled bores in the brake cylinder flange 47 and adapted to receive the screw threaded ends of cap screws 49 which are provided to rigidly secure the brake cylinder casing against the outboard flange 18 of the journal box.

A brake cylinder piston 54 is slidably mounted in the piston bore 43 and is provided on its outer end with a cup-shaped packing 55 having a skirt portion 56 in sliding contact with the piston bore 43 for preventing leakage of fluid under pressure past the piston from a pressure chamber 57 provided at the outboard face of the packing. The chamber 57 is connected to a brake cylinder pipe 58 through which fluid under pressure is adapted to be supplied to said chamber for acting on the piston to move same in the direction of the wheel 1 for applying the brakes on the wheel and through which fluid under pressure is also adapted to be released to permit release of the brakes on the wheel.

The brake cylinder piston 54 is connected to the pressure ring 37 at the opposite end of the journal box by means of a plurality of struts or pins 60 which are spaced from each other around the sleeve 19 and which extend through suitably aligned bores in flanges 17 and 18 at the opposite ends of the journal box. The inboard end of each of the pins 60 is provided with a head 61 which fits in a suitable recess provided in the inner portion 39 of the ring 37. A washer 62 on each of the pins 60 bears against its head 61 and overlaps the side of the recess in which said head is disposed and is welded to the ring 37 thereby securing the pin to the ring so that both will move together.

The opposite ends of the pins 60 are disposed in a chamber 63 formed within the cylindrical portion 46 of the brake cylinder casing. Extending into chamber 63 and overlapping the ends of pins 60, is an annular outward extension 64 of the brake cylinder piston. The extension 64 is provided in its inboard face with a recess 65 for receiving the end of each of the pins 60, and adjacent the open end of this recess each of the pins is provided with an annular groove 66. A retaining plate 67 is provided for securing the end of each of the pins 60 to the extension 64 of the brake cylinder piston. Each of these plates has a slot 68 to receive the reduced section of pin 60 at the bottom of the groove 66 so as to thereby fit over the pin between the side walls of said groove. At opposite sides of each pin the respective plate 67 is rigidly secured to the piston extension 64 by cap screws 70 so as to thereby secure the extended portion 64 of the brake cylinder piston to the pins 60.

On the outer face of the brake cylinder piston packing 55 are provided a plurality of stops 71 which are adapted to engage the pressure head 44 of the brake cylinder device at substantially the same time as the stops 40 on ring 37 engage the inboard flange 17 on the journal box, either one or the other or both of which are adapted to define the release position of the ring 37 and thereby of the brake disks, above mentioned.

A release spring 72 encircling the nut 28 on the end of axle 6 and encircled by the brake cylinder piston 54 is provided for moving said piston and thereby the struts or pins 60 and ring 37 to their release positions upon the release of fluid under pressure from the pressure chamber 57.

The parts so far described may be substantially like similar parts of the truck and brake structure disclosed in the copending application hereinbefore referred to.

According to the invention I make the brake cylinder piston 54 in two parts 75 and 76 which when assembled in the brake cylinder casing are adapted to abut in piston bore 43 at a line of division indicated by the reference numeral 77.

The inboard portion 76 of the brake cylinder piston has a frustro-conical shaped portion 78 extending into the interior of the outboard portion 75 of said piston but not contacting same. At the smaller end of the frustro-conical shaped portion 48 there is provided an inwardly extending annular flange 79 against which the outer end of the release spring 72 bears. It will be apparent that the pressure of the release spring applied to the flange 79 and transmitted therefrom through the frustro-conical shaped portion 78 to the inboard part 76 of the brake cylinder piston and thence to the outboard part of the brake cylinder piston will move both of these parts to their brake release position shown.

The inner end of the release spring 72 bears against a ring 80 which encircles the nut 28 on the end of axle 6 and which engages the outboard face of the backing plate 24 and is thus supported by the outboard flange 18 on the journal box. This ring extends beyond the spring 72 and to the outboard face of this extended part a plurality of bosses 81 are secured by welding, these bosses being equally spaced from each other around the spring.

A bolt 82 extends through a suitable bore in each of the bosses 81 and has an enlarged head portion 83 disposed in an opening in the ring of greater size than said bore so as to secure the bolts against pulling out of said ring. Each of these bolts extends from the ring 80 through a suitable bore provided in a wall 84 of a pocket 85 struck inwardly from the frustro-conical shaped portion 78 of the inboard part 76 of the brake cylinder piston. In each pocket 85 a nut 86 is provided on the end of the bolt extending therein, this nut being slightly spaced from the wall 84 when the parts of the brake cylinder device are assembled, as shown in the drawing. With the several nuts 86 thus spaced from the walls 84 it will be apparent that the release spring 72 is free to act to move the outboard part 75 of the brake cylinder piston, the inboard part 76 of the brake cylinder piston and thereby the several struts or pins 60 and the ring 37 at the opposite end of the journal box to their release positions shown.

When the brake cylinder piston 54 is moved in the direction of the journal box 15 by fluid under pressure supplied to chamber 57 for effecting an application of brakes on the wheel, this movement of both parts of the brake cylinder piston and thereby of the walls 84 through which the bolts 82 extend is relative to said bolts, said walls moving away from the nuts 86. These bolts and the nuts 86 thus in no way interfere with the normal functioning of the brake cylinder device.

If a workman desires to inspect the interior of the brake cylinder device or to repair or clean and lubricate same, he removes the cap screws 49 securing the brake cylinder casing to the ring 48 which is secured to the outboard flange 18 of the journal box. He then pulls the brake cylinder casing away from the journal box, the outboard portion 75 of the brake cylinder piston remaining in the cylinder. Under this condition the brake cylinder release spring 72 is held in the same compressed condition as when the brake cylinder casing is in place due to the inboard portion 76 of the brake cylinder piston being connected through the medium of the retaining plates 67 and pins 60 to the ring 37 at the opposite end of the journal box, which ring is in contact through the medium of stops 40 with the inboard end of the journal box. The parts of the brake cylinder device may then be inspected, cleaned, or repaired as required and replaced in their operating positions without any interference from the release spring 72.

In initially applying the brake mechanism to the journal box 15 the several pins 60 are first secured to the ring 37 and then applied to the journal box by threading said pins through the bores in the inboard and outboard flanges thereof.

Before mounting the inboard portion 76 of the brake cylinder piston in position the release spring 72 is mounted therein against flange 79. The ring 80 having the bolts 82 applied thereto, is then mounted against the opposite end of the spring following which this assembly is placed in a press for moving the parts together. During this process the several bolts 82 are threaded through the bores in the wall 84 of pockets 85. After a desired compression of the release spring 72 has been attained, the nuts 86 are applied to the ends of the bolts 82 and screwed up against the walls 84 for securing the spring in a predetermined compressed condition. This assembly is then removed from the press and with the retaining plates 67 not yet applied to the outwardly extending portion 64 of the brake cylinder piston the assembly is mounted over the ends of the pins 60.

With the ring 37 at the inboard end of the journal box in its release position shown and the inboard portion 76 of the brake cylinder piston in contact with the nuts 86 the ends of the pins 60 will only enter the recesses 65 in the outwardly extending part 64 of the piston to a slight extent but the degree of such entry is sufficient to support this part of the brake cylinder piston on said pin. The retaining plates 67 are then slipped into the grooves 66 and the cap screws 70 are started into the part 64 of the brake cylinder piston and turned up against the retaining plates by hand. A wrench must then be applied to the cap screws 70 to pull the plates 67 and portion 64 of the brake cylinder piston into contact. This contact is obtained by movement of the inboard part of the brake cylinder piston in the direction of the journal box relative to the pins 60, and during such movement the space shown in the drawing between the nuts 86 and the walls 84 is obtained to thereby insure freedom of the release spring 72 for moving the brake cylinder piston to its release position.

It will now be apparent that the caging of spring 72 to a predetermined length under compression between the inboard part 76 of the brake cylinder piston and the ring 80 by means of bolts 82 will permit the ready application of said part of the piston to the outer end of the struts or pins 60 without any opposition from the spring. After this assembly including the caged spring 72 is hung on the pins 60 and the cap screws 70 are started by hand then and only then will the spring become effective to oppose assembling of the brake cylinder piston to its operating condition, but such movement is readily effected by a wrench applied to the cap screws 70.

*Summary*

It will now be apparent that the improved means for confining the brake cylinder release spring 72 before application to the brake cylinder device prevents interference of said spring in assembling and disassembling the brake cylinder casing from the outboard flange 18 of the journal box and also facilitates the assembly of the various parts of the brake mechanism to the journal box. Further, the possibility of injury to a workman due to the release spring during such operations is obviated.

While only one illustrative embodiment of the invention has been shown and described in detail, it is not the intention to limit the scope to that embodiment or otherwise than by the terms of the appended claims.

Having now described my invention, what I claim as new and desire to secure by Letters Patent is:

1. A fluid motor comprising a member, a casing mounted thereon, securing means removably securing said casing to said member, piston means in said casing movable in the direction of said member under the action of fluid pressure, an element supported on said member, expansible spring means interposed between said element and said piston means under compression and operative upon release of fluid under pressure on said piston means to move same away from said member to the opposite end of said casing, and adjustable means connecting said element to said piston means and adjusted to limit movement of said piston means under the action of said spring means to a degree no less than required to move said piston means to said opposite end of said casing but no greater than to provide for at least partial securing of said casing and member together by said securing means unopposed by said spring means.

2. A fluid motor comprising a member, a casing having one end in contact with said member, screw means removably securing said casing and member together, piston means in said casing movable in the direction of said member under the action of fluid pressure, expansible spring means having one end supported on said member and the opposite end acting on said piston means and operable upon release of fluid under pressure on said piston means to move same to the opposite end of said casing, and adjustable means connecting the one end of said spring means to the opposite end and adjusted to limit the expansion thereof to a degree no less than required to move said piston means to said opposite end of said casing but providing for at least partial application of said screw means to said casing and member unopposed by said spring means.

3. A fluid motor comprising a member, a casing having one end in contact with said member, screw means removably securing said casing and member together, piston means in said casing movable in the direction of said member under the action of fluid pressure, expansible spring means having one end supported on said member and the opposite end acting on said piston means and operable upon release of fluid under pressure on said piston means to move same to the opposite end of said casing, an element interposed between said member and the adjacent end of said spring means, bolt means having one end fixed to said element and having a sliding connection with said piston means providing for movement thereof in said casing, and means on said bolt means operative to cooperate with said piston means for limiting the expansion of said spring means to a degree no less than required for moving said piston means to said opposite end of said casing but providing for at least partial application of said screw means to said casing and member unopposed by said spring means.

4. A fluid motor comprising a member, a casing having one end in contact with said member, screw means removably securing said casing and member together, piston means in said casing movable in the direction of said member under the action of fluid pressure, expansible spring means having one end supported on said member and the opposite end acting on said piston means and operable upon release of fluid under pressure on said piston means to move same to the opposite end of said casing, bolt means having one end fixed with respect to said member and having a sliding connection with said piston means providing for movement of said piston means in said casing relative to said bolt means, said bolt means being adapted to cooperate with said piston means to limit the expansion of said spring means to a degree slightly exceeding that required for moving said piston means to said opposite end of said casing but providing for at least partial application of said screw means to said casing and fixed member unopposed by said spring means.

5. A fluid motor comprising in combination a piston casing, a member engaging one end of said casing, removable screw means securing said member and casing together, piston means in said casing adapted to be moved by fluid under pressure in the direction of said member, spring means interposed between said member and piston means and operable upon the release of fluid under pressure on said piston means to move same in the opposite direction to a position in substantial contact with said casing, an element interposed between one end of said spring means and said member, and adjustable means connecting said element to said piston means providing for movement of said piston means in said casing and adjusted to limit expansion of said spring means to a degree no less than required for moving said piston means to said position in substantial contact with said casing but no greater than to provide for at least partial application of said screw means to said casing and member unopposed by said spring means.

6. A fluid motor comprising in combination a piston casing, a member engaging one end of said casing, removable screw means securing said member and casing together, piston means in said casing adapted to be moved by fluid under pressure in the direction of said member, spring means interposed between said member and piston means and operable upon the release of fluid under pressure on said piston means to move same in the opposite direction to a position in substantial contact with said casing, and means for limiting the expansion of said spring means and thereby movement of said piston means relative to said member comprising an element interposed between said member and the adjacent end of said spring means, bolt means having one end secured to said element and having a slidable connection with said piston means providing for movement thereof in said casing, and means provided on the opposite end of said bolt means adapted to cooperate with said piston means to limit the expansion of said spring means to a degree slightly exceeding that required to move said piston means to said position but providing for at least partial application of said screw means to said casing and member unopposed by said spring means.

7. A fluid motor comprising a casing, a member adapted to engage one end of said casing, removable means securing said member and casing together, a rod slidably mounted in said member, piston means in said casing connected to one end of said rod and adapted to be operated by fluid under pressure to move said rod outwardly of said member for applying brakes, spring means interposed between said member and piston means and operable upon release of fluid under pressure on said piston means to move same in a direction away from said member, means securing said rod to said piston means for rendering said spring means operable to move said rod with said piston means, means associated with said rod and cooperative with said member for limiting the degree of movement of said rod and thereby of said piston means by said spring means, and means supported on said member and having a connection with said piston means providing for operation of said piston means in said casing but operative to limit the expansion of said spring means and thereby movement of said piston means to a degree which provides for at least partial securing of said rod to said piston means by the securing means unopposed by said spring means.

8. A fluid motor comprising in combination a relatively fixed member, a piston casing mounted against one side of said member, screw means removably securing said casing and member together, a piston in said casing movable in the direction of said member by fluid under pressure, spring means interposed between said member and piston and operable upon the release of fluid under pressure on said piston to move same in the opposite direction, a rod slidably mounted in said member, removable means securing the end of said rod adjacent said piston to said piston for movement therewith in both directions, means associated with the opposite end of said rod adapted to cooperate with said member for limiting movement of said piston by said spring means, and means for limiting the expansion of said spring means to a degree providing for at least partial securing of said rod to said piston by said removable securing means unopposed by said spring means.

9. A fluid motor comprising a relatively fixed member, a piston casing having one end mounted against one face of said member, screw means removably securing said member and said casing together, piston means in said casing adapted to be moved under the action of fluid pressure in the direction of said member, spring means interposed between said piston means and member under compression and operable to move said piston means away from said member into substantial contact with the opposite end of said casing upon the release of fluid under pressure on said piston means, a rod slidably mounted in a bore in said member and having one end in contact with said piston means, screw means removably securing said one end of said rod to said piston means, means associated with the opposite end of said rod adapted to engage an opposite face of said member at substantially the same time as said piston means moves into contact with said casing, an element engaging said member and supporting the adjacent end of said spring means, and means connecting said element to said piston means providing for movement of said piston means against said spring means in the one direction, and into substantial contact with said casing in the opposite direction, the last named means being adapted to limit the expansion of said spring means and thereby movement of said piston means in a direction away from said member to a degree which provides for the application and removal of the screw means, securing said casing and member together, unopposed by said spring means, and which also provides for at least partial application of the screw means securing said rod to said piston means also unopposed by said spring means.

10. A fluid motor comprising a relatively fixed member, a casing having one end removably secured to said member and the opposite end constituting a pressure head, a piston in said casing cooperating with said pressure head to form a chamber to receive fluid under pressure for acting on said piston to move same in the direction of said member, and spring means interposed between the opposite side of said piston and said member for urging said piston into substantial contact with said pressure head upon the release of fluid under pressure from said chamber, said piston comprising a cup shaped part adjacent said pressure head and a ring-like part adapted to engage the peripheral edge of said cup shaped part and having an inwardly extending part engaged by one end of said spring means, an element interposed between the opposite end of said spring means and said member, and bolt means having a relatively fixed connection with said element and a telescopic connection with said inwardly extending part providing for movement of said piston means in said casing but adapted to limit expansion of said spring means to a degree no less than required for movement of said piston into contact with said pressure head but adapted to provide for at least partial application of said casing to said member unopposed by said spring means.

11. A brake cylinder device comprising in combination with a relatively fixed member a cup shaped casing having its open end mounted against one face of said member, screw means removably securing said casing to said member, a piston slidably mounted in said casing and cooperating with the closed end of said casing to form a pressure chamber adapted to receive fluid under pressure for moving said piston in the direction of said member for applying brakes, a coil spring having one end acting on said piston to move same in the opposite direction into substantial contact with the closed end of said casing upon release of fluid under pressure on said piston, said piston comprising an inner cup shaped part disposed adjacent the closed end of said casing and an outer ring-like part adjacent the open end of said casing adapted to contact the peripheral edge of said inner part for transmitting the pressure of fluid on said inner part to apply the brakes, the said outer part of said piston having an inwardly extending part engaged by the said one end of said spring, a ring supported on said member engaged by the opposite end of said spring, a plurality of bolts spaced around said spring and having one end secured to said ring, said bolts extending through bores in the said inwardly extending part of the said outer part of said piston providing for movement of said piston relative to said bolts to its different positions, and a nut secured to each of said bolts adapted to engage the said inwardly extending part of the said outer part of the piston for limiting expansion of said spring to a degree providing at least for movement of said piston to its release position and also providing for at least partial application of said screw means to said casing and member unopposed by said spring.

12. A brake cylinder device comprising in combination with a relatively fixed member having two oppositely disposed and substantially parallel arranged flanges, a casing having an open end mounted against one of said flanges and having an opposite closed end, screw means removably securing said casing to said one flange, a brake cylinder piston slidably mounted in said casing and having at its outer end which is adjacent the open end of said casing an outwardly extending annular part, a plurality of pins spaced from each other around a circle in coaxial relation with said piston and slidably mounted in aligned bores through the said flanges and having their ends adjacent said piston aligned with said annular part of said piston, screw means removably securing the ends of said pins to said annular part of said piston, stop means associated with the opposite ends of said pins adapted to cooperate with the other of said flanges for defining a brake release position of said pins, said piston being adapted to substantially engage the closed end of said casing to define its brake release position when said pins are in their brake release positions, a coil spring having one end acting on said piston for urging said piston and pins to their brake release positions, said piston being movable by fluid under pressure supplied to act on its inner face in the direction of said one flange for moving said pins from their release positions through said flanges to effect an application of brakes, a ring disposed between said one flange and the opposite end of said spring, and means connecting said ring to said piston operative to limit expansion of said spring and thereby movement of said piston by said spring to a degree greater than required for moving said piston and pins to their brake release positions but which provides for at least partial application and removal of the screw means securing said casing to said one flange unopposed by said spring and which also provides for at least partial application and removal of the screw means securing said pins to said piston also unopposed by said spring.

JOSEPH C. McCUNE.